April 17, 1962 S. BAR 3,030,231

RECORDING TAPE HAVING PERMANENT CURVED END

Filed Feb. 7, 1958

INVENTOR
SOLO BAR
BY Irwin S. Thompson
ATTY.

United States Patent Office 3,030,231

Patented Apr. 17, 1962

3,030,231

RECORDING TAPE HAVING PERMANENT CURVED END

Solo Bar, 6 Impasse Lemiere, Paris, France

Filed Feb. 7, 1958, Ser. No. 713,916
6 Claims. (Cl. 117—76)

It is a well-known fact that initiating the winding of magnetic tape onto empty receiver spools is fastidious operation, owing to narrowness of the space between the flanges of such spools.

It is usual for a loop to form that is too big to enable proper contact to be made with the hub, so that the receiver spool continues to rotate freely without effecting a tightening of the tape windings. It is consequently necessary to induce the winding on, either by hand-rotating the receiver spool while maintaining the tape under tension, or by inserting and in some way jamming the end of the tape in one of the slits on the spool hub.

Certain types of magnetic tape or even the spools themselves are therefore provided with special anchoring or fastening means which are naturally efficient but which complicate manufacture and increase their cost.

The object of the present invention is to so improve magnetic recording tapes as to facilitate the start of their winding onto the receiving spool of magnetic tape-recorders, in particular, by ensuring a self-tightening of the end onto the receiver-spool hub. Said invention consists basically in the fact that the ends of such tapes are so processed as to tend naturally to form an open loop. These ends shall preferably adopt a natural yet flexible curve of radius less than that of the spool hub.

With a tape incorporating such a feature, it will suffice merely to place the end between the flanges of the receiver spool and to set the tape-recorder in motion. The end of the tape is drawn along by the capstan and winds itself around the hub and, once the spool has completed more than one revolution the subsequent windings tighten themselves onto the first one without slipping.

This natural and flexible curvature of the tape ends can be obtained in several ways, all of which are encompassed by the present invention.

In one embodiment, the tape ends are coated on one side only with a layer or thickness which produces a tensioning effect in the tape, so provoking a curling effect. This thickness may notably be obtained by a simple folding back of the tape on itself before gluing.

The tendency for the ends to curl may also be obtained by imparting a permanent deformation to them, either by embossing or by providing them with one or more suitably disposed flutings.

These several methods may, in fact, be used in combination, for example by coating both sides of the tape with a suitable varnish in order to impart greater stiffness to them and then proceeding with appropriate embossing.

Alternatively, a permanent curvature of the required radius may be imparted to the tape ends, once they have been stiffened.

Lastly, it may be found advantageous to select a varnish which remains slightly adhesive or sticky, to the extent found most suitable.

Solely by way of illustration, a few examples of possible embodiments of the improved magnetic recording tape according to the invention are shown in the accompanying diagrams, wherein.

Figure 1:
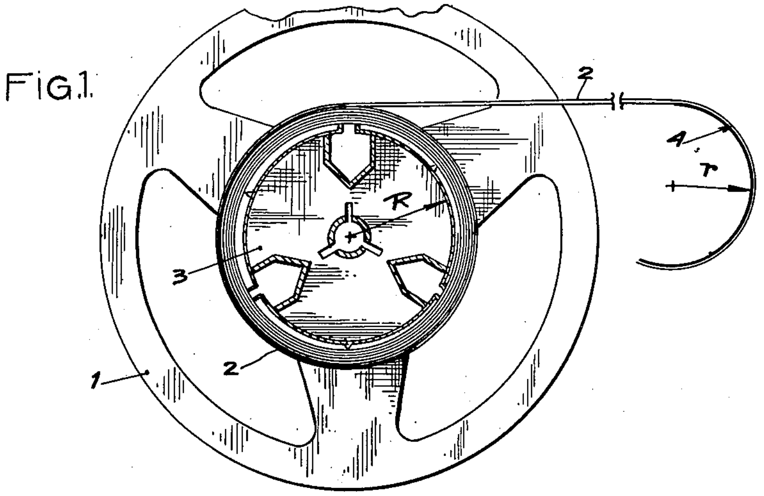
FIG. 1 is a cross-section view of a magnetic tape recorder spool carrying a magnetic tape processed according to the invention.
Figure 2:
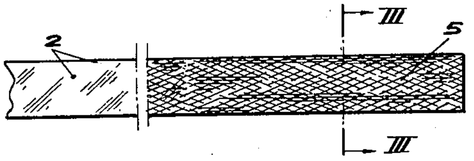
FIG. 2 shows the same extremity flattened out.

Referring to FIG. 1, the magnetic tape-recorder spool 1 carries a magnetic tape 2. Depending on the preferred form of embodiment, the end of this tape is so processed that it forms a natural curl of radius $r$ less than the outer radius R of the spool hub 3.

For this purpose, the inner side 4 of tape is merely coated with a layer of some appropriate varnish which, when dry, will bring about the required tension but which nevertheless will preferably remain slightly adhesive or sticky.

Figure 3:
FIG. 3 is a sectioned view of this extremity along a line III—III in FIG. 2.
Figure 4:
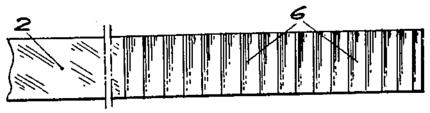
FIGS. 4 to 8 illustrate a number of variations in the embodiment of the invention, FIGS. 5 and 7 being cross-section views of the tapes shown in FIGS. 4 and 6 respectively.
Figure 5:
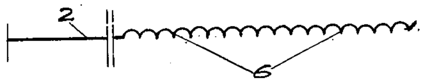
Figure 6:
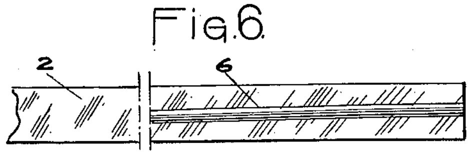
Figure 7:
Figure 8:
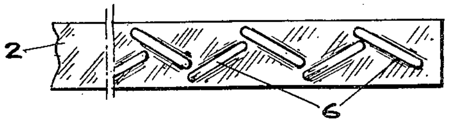

Alternatively, as shown in FIG. 3, the extremity of tape 2, varnished or otherwise on one or both sides, is provided with a suitably designed embossing 5.

Suitably directed ridges, flutings or ribs 6 may also be formed thereon, as shown in FIGS. 4 to 8.

Nor is there any objection to subjecting the tape leaders, with which certain tapes are already provided, to the above-described processing rather than the tape itself, or else the tape leaders alone for subsequent attachment or sticking on to the tape ends.

The processing forming the object of the present invention may be applied to magnetic tapes either in the course of their manufacture or else after they have been put into service, thus valorizing such products as well as rendering their use simpler and more pleasant.

The natural curling effect imparted to the tape ends, according to the present invention, offers a further practical advantage in that the terminal windings are kept tight in the case of loaded spools, whereas hitherto there was a tendency for the free end of the tape to escape from between the flanges of the spool.

Lastly, although I have so far referred only to magnetic tapes, it is clearly evident that my invention may be applied with equal advantage to any kind of tape or band, whatever use they may be intended for, when it is a matter of facilitating their winding onto receiver spools.

I claim:

1. An improved recording tape, in particular a magnetic tape, to be wound on a spool, having the extremities thereof stiffened and formed into a flexible open-ended loop, with a radius of curvature, approaching the radius of the hub of a spool on which said tape is adapted to be wound without any further means.

2. An improved recording tape, in particular a magnetic tape, according to claim 1, in which the curling of the extremities is enhanced by a permanent deformation of the cross section of said extremities.

3. An improved recording tape, in particular a magnetic tape, according to claim 1, the curling of the extremities of which is enhanced through embossing.

4. An improved tape, in particular a magnetic tape, according to claim 1, the curling of the extremities of which is enhanced by ribs stamped in said extremities.

5. An improved recording tape, in particular a magnetic tape, the extremities alone of which are coated, on one side only, with a layer of a varnish for creating a tension in said tape, thereby causing the curling up of said extremities.

6. An improved recording tape for recording information thereon, which tape is capable of being wound on a hub of a spool, at least one extremity of said tape being stiffened and formed into a flexible open-ended loop having a radius of curvature less than the radius of said hub of said spool on which said tape is adapted to be wound without any further means.

References Cited in the file of this patent

UNITED STATES PATENTS

| | | |
|---|---|---|
| 1,755,818 | Ganzinotti | Apr. 22, 1930 |
| 1,815,010 | Pollock et al. | July 14, 1931 |
| 2,105,238 | Wittel | Jan. 11, 1938 |
| 2,114,187 | Howell | Apr. 12, 1938 |
| 2,645,494 | Keller | July 14, 1953 |

FOREIGN PATENTS

| | | |
|---|---|---|
| 630,563 | Great Britain | Oct. 17, 1945 |